US012620392B2

(12) United States Patent
Or et al.

(10) Patent No.: US 12,620,392 B2
(45) Date of Patent: May 5, 2026

(54) INITIATING AN ACTION BASED ON A VOICE MESSAGE TEXT GENERATED FROM A VOICE MESSAGE

(71) Applicant: INTERNATIONAL BUSINESS MACHINES CORPORATION, Armonk, NY (US)

(72) Inventors: Arif Ege Or, Cracow (PL); Tymoteusz Gedliczka, Cracow (PL); Umit Bektas, Cracow (PL); Aleksandra Szostak, Cracow (PL); Andrei Nosatii, Cracow (PL)

(73) Assignee: International Business Machines Corporation, Armonk, NY (US)

( * ) Notice: Subject to any disclaimer, the term of this patent is extended or adjusted under 35 U.S.C. 154(b) by 304 days.

(21) Appl. No.: 18/461,333

(22) Filed: Sep. 5, 2023

(65) Prior Publication Data

US 2025/0078819 A1 Mar. 6, 2025

(51) Int. Cl.
| | |
|---|---|
| *G10L 15/18* | (2013.01) |
| *G10L 15/26* | (2006.01) |
| *G10L 25/63* | (2013.01) |
| *H04W 4/90* | (2018.01) |

(52) U.S. Cl.
CPC .............. *G10L 15/18* (2013.01); *H04W 4/90* (2018.02)

(58) Field of Classification Search
CPC ......... G10L 15/18; G10L 15/26; G10L 25/63; H04W 4/90; G08B 29/186; G08B 25/016; H04M 1/575; H04M 1/72454; H04M 1/72433; H04M 1/72469
See application file for complete search history.

(56) References Cited

U.S. PATENT DOCUMENTS

| | | | |
|---|---|---|---|
| 6,977,898 B1 | 12/2005 | Miriyala | |
| 7,082,309 B2 | 7/2006 | Park | |
| 8,412,530 B2 | 4/2013 | Pereg et al. | |
| 9,319,504 B2 * | 4/2016 | Schroeter | H04M 1/6058 |
| 9,491,298 B2 | 11/2016 | Salmon | |
| 10,069,965 B2 | 9/2018 | Karimi-Cherkandi et al. | |
| 10,743,168 B1 | 8/2020 | Erenel et al. | |

(Continued)

OTHER PUBLICATIONS

Rosenberg, L., "Do Texts Go Through on New Year's Eve at Midnight? Here's Why They Might Not," [online] Elite Daily, News, © 2023 BDG Media, Inc., Dec. 23, 2017, retrieved from the Internet: <https://www.elitedaily.com/p/do-texts-go-through-on-new-years-eve-at-midnight-heres-why-they-might-not-7677692>, 4 pg.

(Continued)

*Primary Examiner* — Daniel C Washburn
*Assistant Examiner* — Penny L Caudle
(74) *Attorney, Agent, or Firm* — CHIP LAW GROUP

(57) ABSTRACT

From a mobile device a voice message text can be received for a voice message provided by a user for a phone call initiated by the user. Context information pertaining to the phone call can be received from the mobile device. Sentiment data can be generated by performing a sentiment analysis on the voice message text. A severity of an event to which the phone call pertains can be determined based on the context information and the sentiment data. An action can be selected based on the severity of the event to which the phone call pertains. Performance of the action can be initiated.

25 Claims, 6 Drawing Sheets

(56) References Cited

U.S. PATENT DOCUMENTS

| | | | |
|---|---|---|---|
| 11,004,461 | B2 | 5/2021 | Howard |
| 2004/0267527 | A1 | 12/2004 | Creamer et al. |
| 2010/0145702 | A1* | 6/2010 | Karmarkar .............. H04L 51/58 704/258 |
| 2016/0142894 | A1* | 5/2016 | Papakonstantinou .. G16H 40/67 455/404.1 |
| 2023/0196025 | A1* | 6/2023 | Thadisetty .......... G10L 15/1815 704/9 |
| 2025/0056229 | A1* | 2/2025 | Edge .................. H04B 7/18593 |

OTHER PUBLICATIONS

Trujillo, A. et al., "Design of emergency call record support system applying natural language processing techniques," In Conference on Information Technologies and Communication of Ecuador, Nov. 2, 20191, pp. 53-65. Cham: Springer International Publishing.

Rosas, E. et al., "Effective communication for message prioritization in DTN for disaster scenarios," Peer-to-Peer Networking and Applications, May 23, 2022, vol. 16, No. 1, pp. 368-382.

Weiss, T.R., "In emergencies, can cell phone network overload be prevented?" Computer World, News, Nov. 5, 2007. 5 pg.

"Earthquake in eastern Turkey knocks out telecommunication networks," [online] NetBlocks, Jan. 24, 2020, retrieved from the Internet: <https://netblocks.org/reports/eastern-turkey-earthquake-knocks-out-telecommunication-networks-gBLRMp84#:~: text=Earthquake%20in%20eastern%20Turkey%20knocks%20out%20telecommunication%20networks,-Posted%20on%20January&text=Network%20data%20from%20the%20NetBlocks,Turkey%20Friday%2024%20January%202020>, 4 pg.

Ezzat, S. et al., "Sentiment analysis of call centre audio conversations using text classification," International Journal of Computer Information Systems and Industrial Management Applications, Dec. 2012, vol. 4, No. 1, pp. 619-627.

Sharma, J. et al., "Emergency detection with environment sound using deep convolutional neural networks," In Proceedings of Fifth International Congress on Information and Communication Technology, ICICT 2020, London, vol. 2, Oct. 1, 2020, pp. 144-154. Singapore: Springer Singapore.

Mell, P. et al., The NIST Definition of Cloud Computing, National Institute of Standards and Technology, U.S. Dept. of Commerce, Special Publication 800-145, Sep. 2011, 7 pg.

* cited by examiner

100

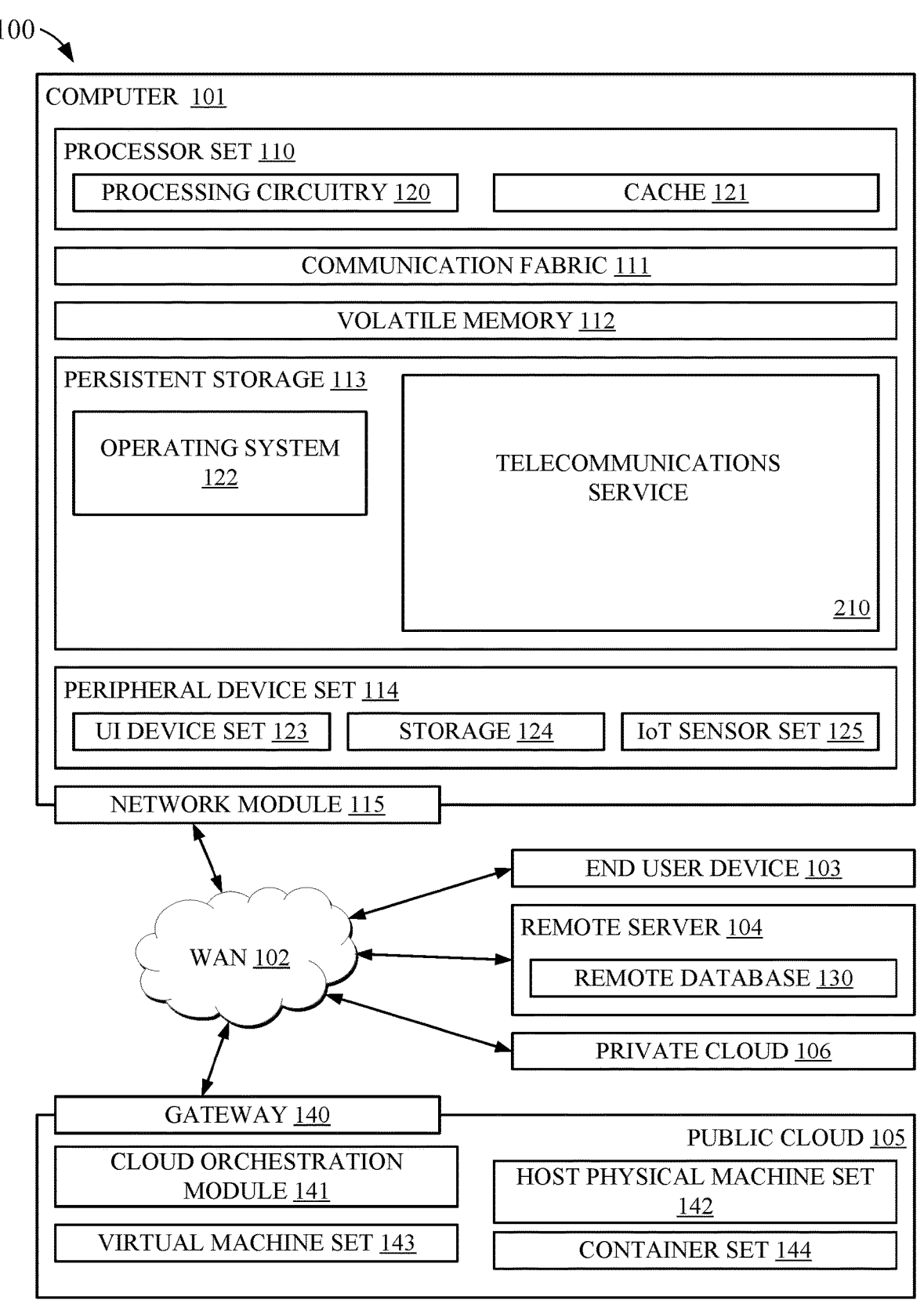

COMPUTER 101

PROCESSOR SET 110

PROCESSING CIRCUITRY 120      CACHE 121

COMMUNICATION FABRIC 111

VOLATILE MEMORY 112

PERSISTENT STORAGE 113

OPERATING SYSTEM 122

TELECOMMUNICATIONS SERVICE

210

PERIPHERAL DEVICE SET 114

UI DEVICE SET 123      STORAGE 124      IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141

HOST PHYSICAL MACHINE SET 142

VIRTUAL MACHINE SET 143

CONTAINER SET 144

INITIATING AN ACTION BASED ON A VOICE MESSAGE TEXT GENERATED FROM A VOICE MESSAGE

BACKGROUND

The present invention relates to mobile communications, and more specifically, to phone call processing.

Mobile communication devices typically are configured to wirelessly communicate over mobile communication networks, for example cellular communication networks. An example of a mobile communication device is a smart phone, which is a portable computing device that combines mobile telephone functions and computing functions into one unit. For instance, smart phones can provide core functions, such as voice calls and text messaging, along with other computing functions.

Mobile communication devices have become ubiquitous throughout much of the world. Indeed, many people consider such devices an essential part of modern living. In contrast to traditional landline telephones, mobile communication devices enable people to communicate from virtually anywhere they may travel, so long as their mobile communication devices are able to establish a wireless network connection.

The use of mobile communication devices is particularly useful during emergencies. For example, if a person suffers a vehicle breakdown, that person can use their mobile communication device to call someone for assistance. Sometimes, however, mobile communication networks become congested, and phone calls that are placed may not go through. This can leave the person stranded until the network congestion eases. Moreover, target call recipients may be busy and not able to answer incoming calls, which also can result in the person being left stranded for some time.

U.S. Pat. No. 10,069,965 B2 discloses a "method of maintaining audio communication in a congested communication channel." "Instead of transmitting the speech from the sender to the receiver side, the speech is converted to text and sent as text data to the receiver side." Similarly, U.S. Pat. No. 7,082,309 B2 discloses a "method for providing a call processing service wherein a short message can be transmitted to another party using a signaling channel in cases where a traffic channel cannot be allocated (for example, in traffic congestion state)." Merely sending the text to the receiver side, however, does not convey contextual information that may be important to convey a sense of urgency for a call.

SUMMARY

In one or more embodiments, a method includes receiving, from a mobile device, voice message text for a voice message provided by a user for a phone call initiated by the user. The method also can include receiving, from the mobile device, context information pertaining to the phone call. The method also can include generating sentiment data by performing a sentiment analysis on the voice message text. The method also can include determining, using a processor, a severity of an event to which the phone call pertains based on the context information and the sentiment data. The method also can include selecting an action based on the severity of the event to which the phone call pertains. The method also can include initiating performance of the action.

A system can include a processor programmed to initiate executable operations. The executable operations can include one or more of the processes described for the above method.

A computer program product includes a computer readable storage medium having program code stored thereon. The program code is executable by a data processing system to initiate operations. The operations can include one or more of the processes described for the above method.

In one or more embodiments, a method can include initiating, by a mobile device, a phone call to a target recipient device. The method also can include receiving, from a telecommunications service, a call status indicator that indicates the phone call is not connected to the target recipient device. The method also can include responsive to receiving the call status indicator that indicates the phone call is not connected to the target recipient device, prompting the user to provide a voice message. The method also can include, responsive to prompting the user to provide the voice message, receiving the voice message from the user. The method also can include converting, by a processor of the mobile device, the voice message to voice message text. The method also can include determining context information pertaining to the phone call by analyzing the voice message. The method also can include communicating the voice message text and the context information to the telecommunications service. The telecommunications service can determine a severity of an event to which the phone call pertains based, at least in part, on the context information, select an action based on the severity of the event to which the phone call pertains, and initiate performance of the action.

A mobile device includes a processor programmed to initiate executable operations. The executable operations can include one or more of the processes described for the above method.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

FIG. 1 depicts a cloud computing environment according to an embodiment of the present invention.

DETAILED DESCRIPTION

Figure 2:
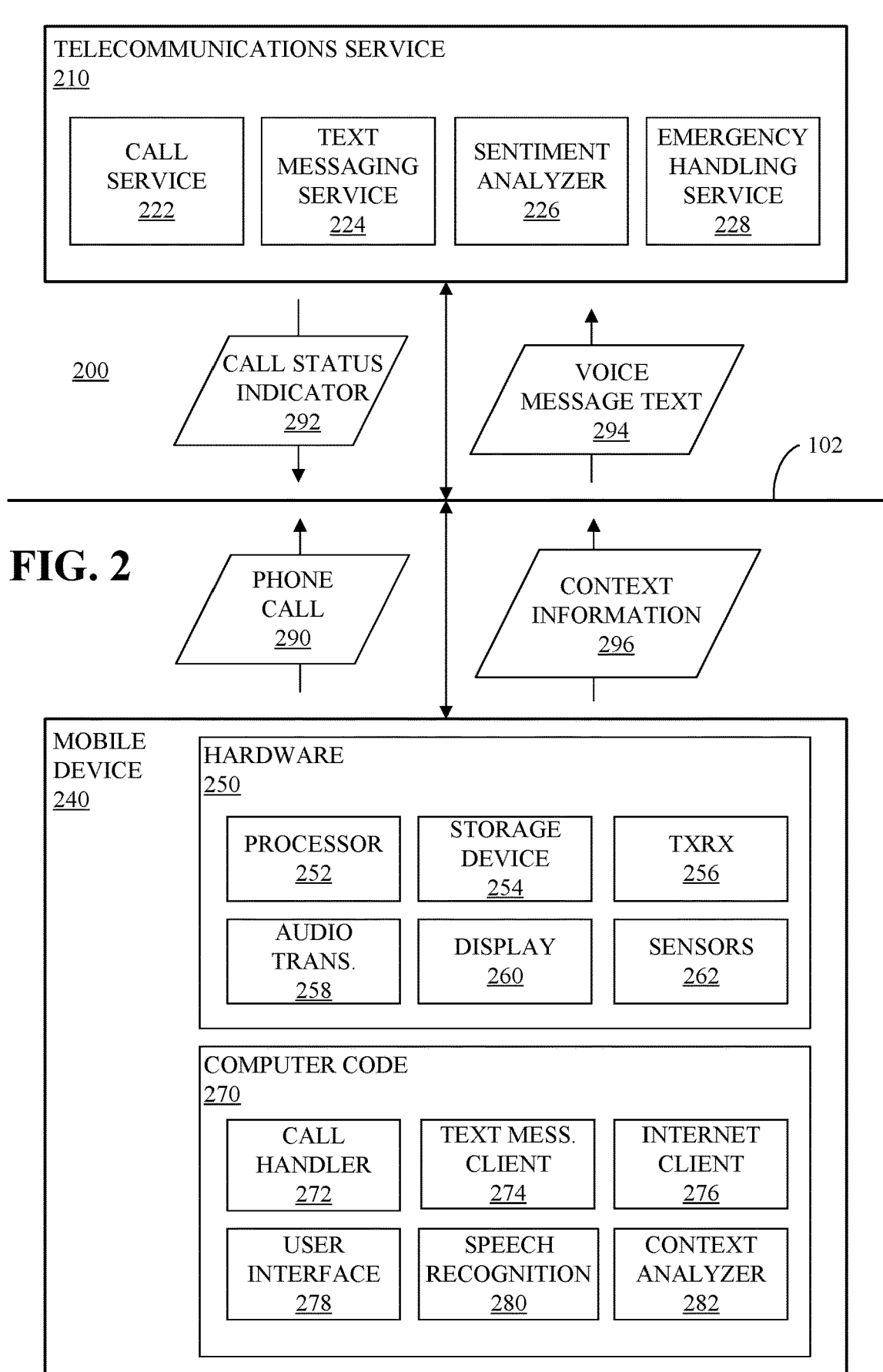
FIG. 2 depicts a mobile communications system according to an embodiment of the present invention.

This disclosure relates to mobile communications, and more specifically, to phone call processing.

In one or more embodiments, a method can include receiving, from a mobile device, voice message text for a voice message provided by a user for a phone call initiated by the user. The method also can include receiving, from the mobile device, context information pertaining to the phone call. The method also can include generating sentiment data by performing a sentiment analysis on the voice message text. The method also can include determining, using a processor, a severity of an event to which the phone call pertains based on the context information and the sentiment data. The method also can include selecting an action based on the severity of the event to which the phone call pertains. The method also can include initiating performance of the action.

Accordingly, telecommunication service call handling is improved for phone calls that pertain to events, for example emergency events, but are not connected to target call recipients. The phone calls may be prevented from connecting to the target call recipients for various reasons, for example due to the communication network being congested or due to the target call recipient not answering the phone call. Nonetheless, the present arrangements ensure that phone calls which pertain to severe events are identified, and call handling operations that address the severe events are initiated. Thus, people who are in need of assistance can receive the needed assistance, even if their mobile devices are unable to establish phone call connections to target call recipients.

Moreover, the sentiment data and context information can convey a sense of urgency for the phone call, thus addressing a disadvantage of method of the prior art. By determining the severity of the event to which the phone call pertains, and initiating performance of the action based on the severity of the event, high severity events (e.g., emergency events) can be prioritized for processing over less severe events. Accordingly, computer resources needed to address severe events are less likely to be tied up attending to less severe events, thus improving performance of the computer resources at processing data pertaining to severe events.

In illustration, in one or more arrangements the method can include classifying the severity of the event and, responsive to a classification of the severity of the event not being a highest severity, adding the event to a queue. In such arrangements, the selecting the action based on the severity of the event to which the phone call pertains can be responsive to a turn for the event in the queue being reached. Accordingly, the processor can process phone calls in order based on the severity of events to which the phone calls pertain.

In one or more arrangements, the adding the event to the queue can include adding to the queue the voice message text and the context information. Accordingly, the processor can process the voice message text and the context information when selecting the action based on the severity of the event.

In one or more arrangements, the context information can include data indicating a tone of a voice of the user in the voice message. Accordingly, urgency conveyed by the tone of the user's voice can be identified by the processor when determining the severity of the event.

In one or more arrangements, the context information can include data indicating data indicating a speech pattern of spoken utterances of the user in the voice message. Accordingly, urgency conveyed by the user's speech pattern can be identified by the processor when determining the severity of the event.

In one or more arrangements, the context information can include data indicating a ratio of an acoustic volume of a voice of the user to an acoustic volume of ambient sounds detected by an input audio transducer of the mobile device. Accordingly, urgency conveyed by the level of ambient sounds can be identified by the processor when determining the severity of the event.

In one or more arrangements, the context information can include data indicating at least one unusual anomaly in physiological data of the user. Accordingly, urgency conveyed by the user's physiological condition can be identified by the processor when determining the severity of the event.

A system can include a processor programmed to initiate executable operations. The executable operations can include one or more of the processes described for the above method.

A computer program product includes a computer readable storage medium having program code stored thereon. The program code is executable by a data processing system to initiate operations. The operations can include one or more of the processes described for the above method.

In one or more embodiments, a method can include initiating, by a mobile device, a phone call to a target recipient device. The method also can include receiving, from a telecommunications service, a call status indicator that indicates the phone call is not connected to the target recipient device. The method also can include responsive to receiving the call status indicator that indicates the phone call is not connected to the target recipient device, prompting the user to provide a voice message. The method also can include, responsive to prompting the user to provide the voice message, receiving the voice message from the user. The method also can include converting, by a processor of the mobile device, the voice message to voice message text. The method also can include determining context information pertaining to the phone call by analyzing the voice message. The method also can include communicating the voice message text and the context information to the telecommunications service. The telecommunications service can determine a severity of an event to which the phone call pertains based, at least in part, on the context information, select an action based on the severity of the event to which the phone call pertains, and initiate performance of the action.

Accordingly, telecommunication service call handling is improved for phone calls that pertain to events, for example emergency events, but are not connected to target call recipients. The phone calls may be prevented from connecting to the target call recipients for various reasons, for example due to the communication network being congested or due to the target call recipient not answering the phone call. Nonetheless, by communicating the voice message text and the context information to the telecommunications service, the present arrangements ensure that phone calls which pertain to severe events are identified, and call handling operations that address the severe events are initiated. Thus, people who are in need of assistance can receive the needed assistance, even if their mobile devices are unable to establish phone call connections to target call recipients.

Moreover, the context information can convey a sense of urgency for the phone call, thus addressing a disadvantage of method of the prior art. By determining the severity of the event to which the phone call pertains, and initiating performance of the action based on the severity of the event, high severity events (e.g., emergency events) can be prioritized for processing over less severe events. Accordingly, computer resources needed to address severe events are less likely to be tied up attending to less severe events, thus improving performance of the computer resources at processing data pertaining to severe events.

In one or more arrangements, the context information can include data indicating a tone of a voice of the user in the voice message. Accordingly, urgency conveyed by the tone of the user's voice can be identified by the telecommunication service when determining the severity of the event.

In one or more arrangements, the context information can include data indicating data indicating a speech pattern of spoken utterances of the user in the voice message. Accordingly, urgency conveyed by the user's speech pattern can be identified by the telecommunication service when determining the severity of the event.

In one or more arrangements, the context information can include data indicating a ratio of an acoustic volume of a voice of the user to an acoustic volume of ambient sounds detected by an input audio transducer of the mobile device. Accordingly, urgency conveyed by the level of ambient sounds can be identified by the telecommunication service when determining the severity of the event.

In one or more arrangements, the context information can include data indicating at least one unusual anomaly in physiological data of the user. Accordingly, urgency conveyed by the user's physiological condition can be identified by the telecommunication service when determining the severity of the event.

A mobile device includes a processor programmed to initiate executable operations. The executable operations can include one or more of the processes described for the above method.

A computer program product includes a computer readable storage medium having program code stored thereon. The program code is executable by a data processing system to initiate operations. The operations can include one or more of the processes described for the above method.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as telecommunications service 210. In addition to block 210, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 210, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 210 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 210 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

FIG. 2 depicts a mobile telephone communications system 200 according to an embodiment of the present invention. Mobile telephone communications system 200 can include telecommunication services 210. Telecommunication services 210 can include a call service 220, a text messaging service 224, a sentiment analyzer 226 and an emergency handling service 228. In one or more arrangements, telecommunication services 210 can be hosted on computer 101 (FIG. 1), although the present arrangements are not limited in this regard. For instance, in one or more arrangements, telecommunication services 210 can be distributed among a plurality of computers, including computer 101, and the plurality of computers can be communicatively linked via one or more WANs and/or one or more LANs. By way of example, call service 222 can be hosted on first server, text messaging service 224 can be hosted on a second server, sentiment analyzer 226 can be hosted on a third server, and emergency handling service 228 can be hosted on a fourth server. The first, second, third and fourth servers can be communicatively linked via one or more WANs and/or one or more LANs. Still, call service 222, text messaging service 224, sentiment analyzer 226 and emergency handling service 228 can be hosted by any other suitable telecommunication services architecture.

Call service 222 can be configured to receive call requests from mobile devices, connect the calls to the call recipients, provide call status information, etc. In this regard, call service 222 can be communicatively linked to a public switched telephone network (PSTN), various base transceiver stations (BTSs), other telecommunication service providers, etc. Text messaging service 224 can receive text messages, for example in accordance with the Short Message Service (SMS) communication protocol, and forward the text messages for communication to the intended recipients. Sentiment analyzer 226 can be configured to determine sentiments of mobile device users, for example based on transcribed text, audio signals detected by mobile devices, and mobile device sensor data, as will be described herein. Emergency handling service 228 can be configured to detect emergencies and assign a severity classification to such emergencies. In one or more non-limiting arrangements, Emergency handling service 228 can comprise one or more models trained, using machine learning, to detect emergency events and assign severity classifications to events. Emergency handling service 228 also can initiate one or more actions based, at least in part, on detected emergency events, severity classifications, and sentiments determined by sentiment analyzer 226. In one or more non-limiting arrangements, emergency handling service 228 also can collect data from one or more external sources, for example news sources and/or social media, and initiate the actions further based on the data collected from the external sources.

Mobile telephone communications system 200 also can include one or more end user devices 103 (FIG. 1), which can include a mobile device 240. Mobile device 240 can be communicatively linked to telecommunications service 210 via WAN 102. In this regard, WAN 102 can include one or more BTSs, one or more wireless repeaters, the PTSN, the Internet, etc. In one or more non-limiting arrangements, mobile device 240 can connect to WAN 102 via a LAN, such as a wireless local area network (WLAN).

Mobile device 240 can be, for example, a smart phone, a smart watch or other wearable computer, a tablet computer or a car phone. Mobile device 240 can include at least some hardware 250 involved in performing the inventive methods, such as a processor 252, at least one storage device 254 (e.g., volatile memory and/or non-volatile storage), one or more transceivers 256, input and output audio transducers 258, at least one display 260 (e.g., touchscreen), and one or more sensors 262. Examples of transceivers 256 include, but are not limited to, cellular communication transceivers, WLAN transceivers (e.g., WiFi® transceivers), personal area network transceivers (e.g., Bluetooth® transceivers), and the like. Examples of sensors 262 include, but are not limited to, accelerometers, gyroscopes, magnetometers, global positioning system (GPS) receivers, heart rate sensors, photoplethysmogram (PPG) sensors (e.g., pulse oximeters), electrocardiography (ECG) sensors, respiratory sensors, galvanic skin response (GSR) sensors and cameras.

Mobile device 240 also can include at least some of the computer code 270, executable by processor 252, involved in performing the inventive methods, such as a call handler 272, a text messaging client 274, an Internet client 276, user interface 278, a speech recognition module 280, and a context analyzer 282.

Figure 3:
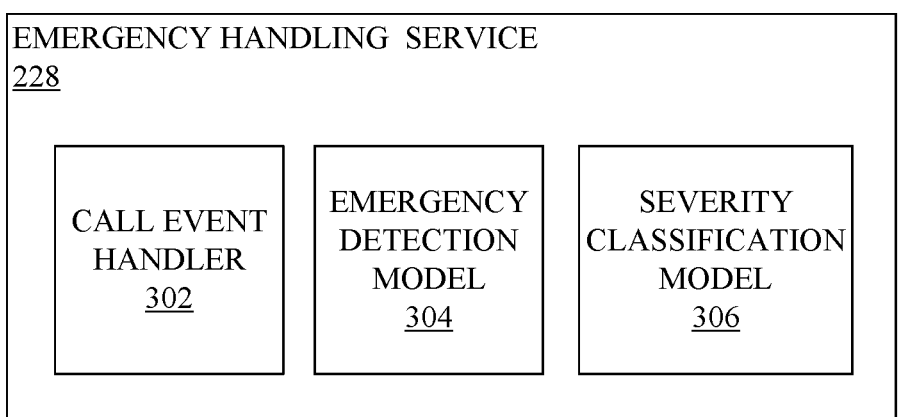
FIG. 3 depicts a block diagram of an emergency handling service according to an embodiment of the present invention.

FIG. 3 depicts a block diagram of emergency handling service 228 according to an embodiment of the present invention. Emergency handling service 228 can comprise a call event handler 302, an emergency detection model 304 and a severity classification model 306.

Call event handler 302 can interface with call service 222, text messaging service 224, sentiment analyzer 226, as well as systems external to telecommunications service 210, such emergency dispatch systems. Call service 222 can initiate a variety of processes and/or actions, as will be described herein.

Emergency detection model 304 can configured to process a sentiment analysis generated by sentiment analyzer 226 and context information 296 and, based on such processing, determine whether the sentiment of a voice message text 294 and the context information 296 pertain to an emergency event. Emergency detection model 304 can be trained, using machine learning, to determine whether a sentiment of a voice message and the context information 296 pertain to an emergency event.

Severity classification model 306 can be configured to process the sentiment analysis generated by sentiment analyzer 226 and the context information 296. Based on such processing, severity classification model 306 can determine a severity of an event (e.g., an emergency event) to which a phone call 290 pertains. Severity classification model 306 can be trained, using machine learning, to determine severity of an event based on the voice message text 294 and the context information 296 pertaining to an event.

Figure 4:
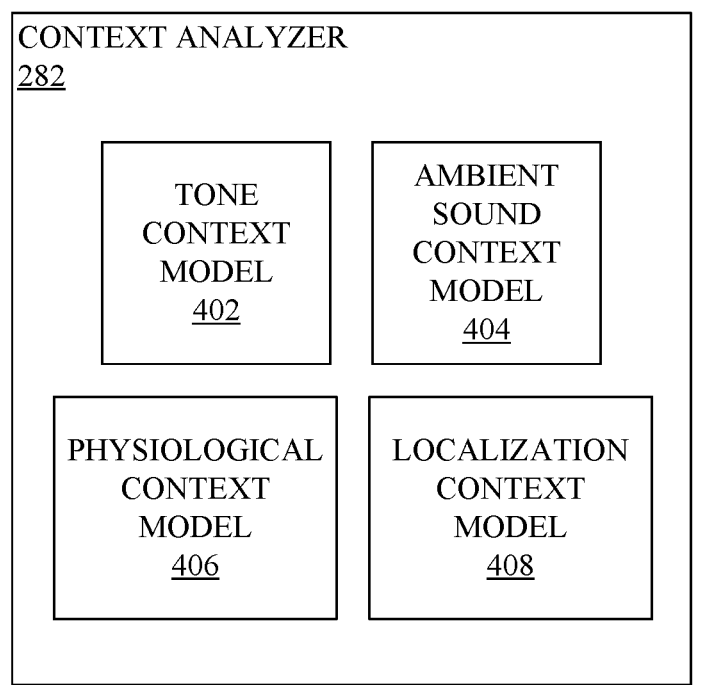
FIG. 4 depicts a block diagram of a context analyzer according to an embodiment of the present invention.

FIG. 4 depicts a block diagram of context analyzer 282 according to an embodiment of the present invention. Context analyzer 282 can comprise a tone context model 402, and ambient sound context model 404, a physiological context model 406 and a localization context model 408.

Tone context model 402 can be configured to determine a tone of a user's voice and a speech pattern of the user in a voice message. Tone context model 402 can determine a mental state of a user based on the tone of the user's voice and the speech pattern of the user's spoken utterances, for example while the user generates the voice message. In this regard, the tone context model can be trained, using machine learning, to perform natural language processing (NLP) and, based on the NLP, determine the mental state of the user. NLP is a field of computer science, artificial intelligence and linguistics which implements computer processes to facilitate interactions between computer systems and human (natural) languages. NLP enables computers to derive computer-understandable meaning from natural language input, both in the form of text and spoken utterances. The International Organization for Standardization (ISO) (e.g., ISO/TC37/SC4) publishes standards for NLP.

Ambient sound context model 404 can be configured to detect significant ambient sounds in audio signals detected by input audio transducer 258, such as screams, sirens, sounds of gunshots, etc.), as well as detect ratios of user voices to ambient sounds. In this regard, ambient sound context model 404 can be trained, using machine learning, to detect the ambient sounds and determine voice-to-noise ratios.

Physiological context model 406 can be configured to receive physiological sensor data from sensors 262. Physiological data can include, but is not limited to, heart rate, heart rhythm, blood circulation, galvanic skin response, respiratory rate, etc. In illustration, physiological context model 406 can receive physiological data from a heart rate sensors, a PPG sensor, an ECG sensor, a respiratory sensor, a GSR sensor, a camera, etc. Based on the physiological sensor data, physiological context model 406 can determine the physiological data for a user, and determine any unusual anomalies in such physiological data. In illustration, while the user uses mobile device 240, physiological context model 406 can monitor and store the user's physiological data as historical data. Physiological context model 406 can determine baseline values for the user's physiological data based on the historical data, and determine whether the user's current physiological data differs from the historical data by at least threshold amount. If so, such circumstances can be identified as unusual anomalies in the user's physiological data. Physiological context model 406 can be trained, using machine learning, to determine unusual anomalies in the physiological data of users.

Localization context model 408 can be configured to receive localized sensor data from sensors 262. Localized sensor data can include, but is not limited to, GPS coordinates, acceleration rates, rotation rates, etc. In illustration, localization context model 408 can receive GPS coordinates from a GPS receiver, acceleration rates from an accelerometer, and rotation rates from a gyroscope. Localization context model 408 also can be configured to receive the audio signals collected from the input audio transducer 258. Based on the localized sensor data and the audio signals, localization context model 408 can determine localized events, for example automobile accidents, natural disasters (e.g., earthquakes, etc.), the user falling, and so on. Localization context model 408 can be trained, using machine learning, to determine localized events.

Figure 5:
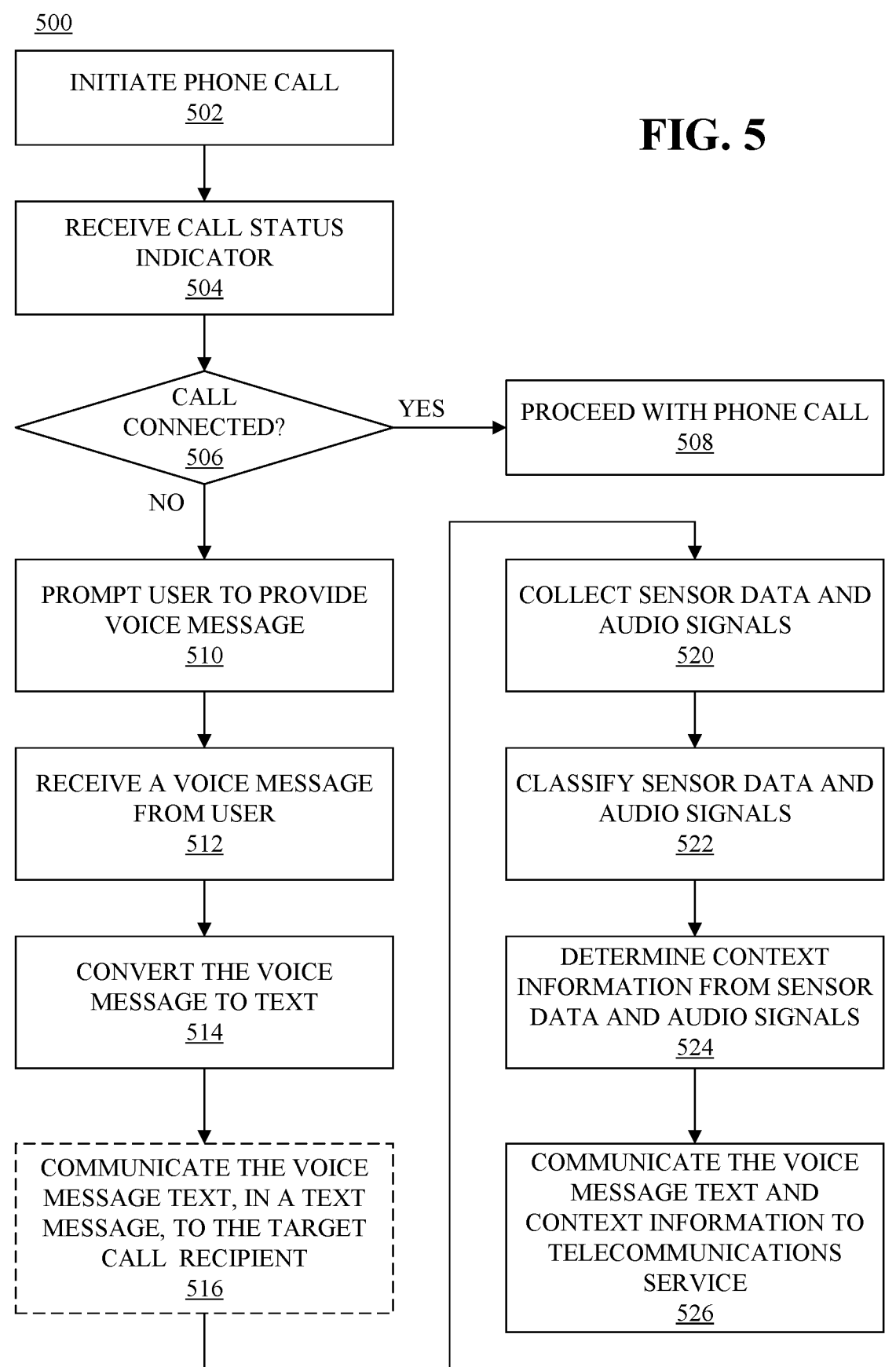
FIG. 5 is a flowchart illustrating an example of a method of responding to a phone call connection failure.

FIG. 5 is a flowchart illustrating an example of a method 500 of responding to a phone call connection failure. Method 500 can be performed by mobile device 240. Reference now will be made to FIGS. 2, 4 and 5.

At step 502 mobile device 240 can initiate a phone call 290 to a target recipient device via telecommunication services 210. The target recipient device can be, for example, another mobile device or a telephone. In illustration, a user of mobile device 240 can initiate the phone call 290 via user interface 278. In response, call handler 272 can initiate the phone call 290, communicating with telecommunications service 210 over WAN 102 using transceiver 256.

At step 504 mobile device 240 can receive a call status indicator 292 from telecommunication services 210. The call status indicator 292 can indicate whether the phone call 290 is connected to the target recipient device. In illustration, if WAN 102 is congested, this preventing the phone call 290 from being connected to the target recipient device, the target recipient device is not reachable (e.g., turned off or out of range of a BTS or repeater), or a user of the target recipient device does not answer the phone call 290, the call status indicator 292 can indicate that the phone call 290 is not connected.

Referring to decision box 506, if the call status indicator 292 indicates that the phone call 290 is connected to the target recipient device, at step 508 mobile device 240 can proceed with the phone call 290. If, however, the call status indicator 292 indicates that the phone call 290 is not connected to the target recipient device, method 500 can proceed to step 510.

At step 510 mobile device 240 can prompt the user of mobile device 240 to provide a voice message. For example, call handler 272 can output an audible prompt to the user via output audio transducer 258 and/or output a visual prompt to the user on display 260 via user interface 278.

At step 512 mobile device 240 can receive the voice message from the user via input audio transducer 258. In illustration, spoken utterances detected by input audio transducer 258 can be communicated to processor 252 as an audio signal. Processor 252 can include an analog-to-digital converter (ADC) that converts the audio signal to digital data, and processor 252 can store the digital data to storage device 254.

At step 514 mobile device 240 can convert the voice message to text. In illustration, call handler 272 can initiate speech recognition module 280 to convert the voice message to voice message text using speech recognition. From step 514, method 500 can proceed to step 526 and, optionally, to step 516.

Optionally, at step 516 mobile device 240 can communicate the voice message text, in a text message, to the target call recipient. In illustration, call handler 272 can initiate text messaging client 274 to generate a text message including the text to which the voice message was converted, and to communicate the text message to the target call recipient.

At step 520 mobile device 240 can collect sensor data from sensors 262, and collect audio signals from input audio transducer 258. In illustration, call handler 272 can receive and collect the sensor data. Further, processor 252 can receive audio signals detected by input audio transducer 258, covert the audio signals to digital data using an ADC, and store the digital data to storage device 254. In one or more arrangements, mobile device 240 can perform step 520 in parallel with performing steps 510-514 or in parallel with performing steps 510-516.

At step 522 mobile device 240 can classify the sensor data and audio signals. In illustration, call handler 272 can initiate context analyzer 282 to classify the sensor data and audio signals.

By way of example, tone context model 402 can analyze the voice message and, based on that analysis, determine a tone of the user's voice in the voice message. Tone context model 402 can assign the tone of the user's voice to a tone classification. Tone context model 402 also can, based on the analysis of the voice message, determine a speech pattern of the user's spoken utterances in the voice message, and assign the speech pattern of the user's spoken utterances to a speech pattern classification. Based on the determined tone of the user's voice and/or the user's speech pattern, tone context model 402 can determine a mental state of the user, and classify the mental state of the user, and assign the user's mental state to a mental state classification.

As another example, ambient sound context model 404 can detect significant ambient sounds in audio signals detected by input audio transducer 258, such as screams, sirens, sounds of gunshots, etc.). Ambient sound context model 404 also can detect an acoustic volume of the voice of the user and an acoustic volume of the ambient sounds. Further, ambient sound context model 404 can determine a ratio of the acoustic volume of the voice of the user to the acoustic volume of the ambient sounds. Ambient sound context model 404 can analyze the ambient sounds and assign the significant ambient sounds to an ambient sound classification. Ambient sound context model 404 also can assign, to a voice-to-noise ratio classification, the ratio of the acoustic volume of the user's voice to the acoustic volume of the ambient sound.

As another example, physiological context model 406 can receive physiological sensor data from sensors 262. Based on the physiological sensor data, physiological context model 406 can determine the physiological data for the user and analyze the physiological data. Based on the analysis, physiological context model 406 can determine any unusual anomalies in such physiological data. Physiological context model 406 can assign the unusual anomalies to a physiological classification.

As another example, localization context model 408 can receive localized sensor data from sensors 262. Localization context model 408 also can receive and analyze the audio signals collected from the input audio transducer 258. Based on the localized sensor data and the analysis of the audio signals, localization context model 408 can determine localized events, for example automobile accidents, natural disasters (e.g., earthquakes, etc.), user's falling, and so on. Localization context model 408 can assign the determined local events to localization classifications.

At step 524 mobile device 240 can determine the context information 296 from the sensor data and audio signals. In illustration, context analyzer 282 can include in the context information 296 the data indicating the tone of the user's voice in the voice message, the data indicating the speech pattern of the user's spoken utterances in the voice message, and/or the data indicating the mental state of the user determined by tone context model 402. Context analyzer 282 also can include in the context information 296 the classifications to which the tone of the user's voice, the speech pattern of the user's spoken utterances and/or the mental state of the user are assigned. Embodiments in which the context information 296 includes data indicating the tone of a voice of the user in the voice message, data indicating the speech pattern of spoken utterances of the user in the voice message and/or data indicating the mental state of the user can convey urgency when the severity of the event is determined.

Mobile device 240 also can include in the context information 296 data indicating the ambient sounds and/or data indicating the voice-to-noise ratio determined by ambient sound context model 404. Context analyzer 282 also can include in the context information 296 the classification to which the ambient sound is assigned and/or the classification to which the voice-to-noise ratio is assigned. Embodiments in which the context information 296 includes data indicating the ambient sounds and/or data indicating the voice-to-noise ratio also can convey urgency when the severity of the event is determined.

Mobile device 240 also can include in the context information 296 data indicating at least one unusual anomaly in the user's physiological data detected by physiological context model 406. Context analyzer 282 also can include in the context information 296 the classifications to which the anomalies in the user's physiological data are assigned. Embodiments in which the context information 296 includes data indicating at least one unusual anomaly in the user's physiological data can convey urgency when the severity of the event is determined.

Mobile device 240 also can include in the context information 296 data indicating localized events determined by localization context model 408. Context analyzer 282 also can include in the context information 296 the classifications to which the localized events are assigned. Embodiments in which the context information 296 includes data indicating localized events can convey urgency when the severity of the event is determined.

By way of example, assume the classifications of the sensor data and audio signals by context analyzer 282 indicates that the user's mental state is extremely stressed, a loud scream is detected as a background sound, anomalies detected in the user's physiological data exceed particular threshold values, and ambient sounds indicate that a car accident has occurred. Based on such classifications, context analyzer 282 can include in the context information 296 data indicating that the user has been in an automobile accident and may need emergency assistance.

In one or more non-limiting arrangements, mobile device 240 also can include in the context information 296 data generated by one or more of sensors 262. In illustration, mobile device 240 can include in the context information 296 the GPS coordinates where mobile device 240 is located.

At step 526 mobile device 240 can communicate the voice message text 294 (i.e., the text generated by performing speech recognition on the voice message) and the context information 296 to telecommunications service 210. In illustration, call handler 272 can use Internet client 276 to communicate the voice message text 294 and the context information 296 to telecommunications service 210 over the Internet using TCP/IP packets or UDP/IP packets, or the call handler 272 can use text messaging client 274 to communicate the voice message text 294 and the context information 296 to telecommunications service 210 in a text message.

Figure 6:
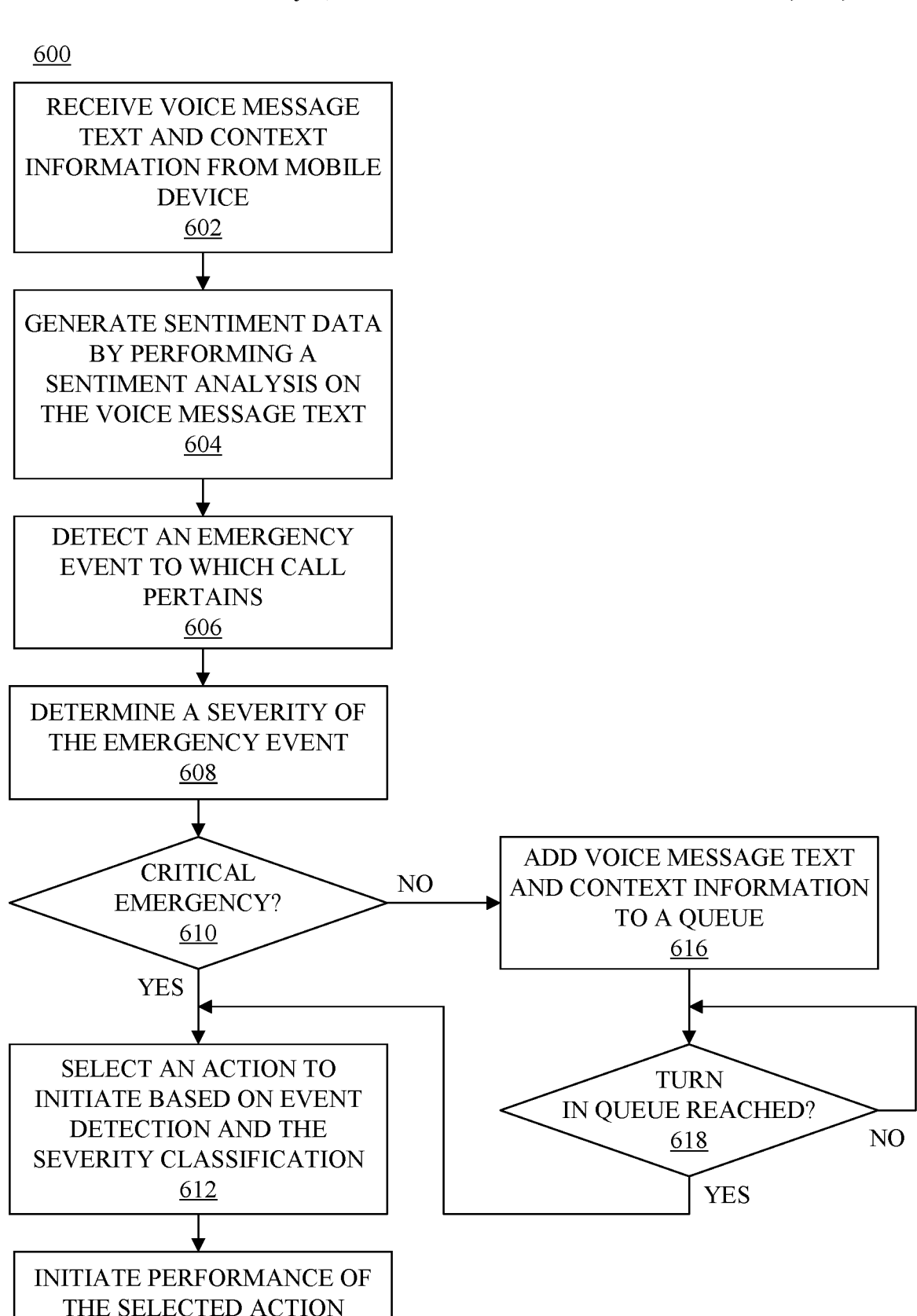
FIG. 6 is a flowchart illustrating an example of a method of responding to a message received from a mobile device in response to a phone call connection failure.

FIG. 6 is a flowchart illustrating an example of a method 600 of responding to a message received from a mobile device in response to a phone call connection failure. Method 600 can be performed by telecommunications service 210. Reference now will be made to FIGS. 2, 3 and 6.

At step 602 telecommunications service 210 can receive, from mobile device 240, the voice message text 294 and the context information 296. In illustration, call service 222 can receive the voice message text 294 and the context information 296 over the Internet using TCP/IP packets or UDP/IP packets, or call service 222 can receive the voice message text 294 and the context information 296 as a text message via text messaging service 224.

At step 604 telecommunications service 210 can generate sentiment data by performing sentiment analysis on the voice message text 294. In illustration, call service 222 can initiate sentiment analyzer 226 to perform the sentiment analysis on the voice message text 294. Semantic analysis is the implementation of computer processes to generate computer-understandable representations of natural language expressions. Semantic analysis can be used to construct meaning representations, semantic underspecification, anaphora resolution, presupposition projection and quantifier scope resolution, which are known in the art. Semantic analysis is frequently used with NLP to derive computer-understandable meaning from natural language input. An unstructured information management architecture (UIMA), which is an industry standard for content analytics, may be used by the sentiment analyzer 226 to implement NLP and semantic analysis.

At step 606 telecommunications service 210 can detect an emergency event to which the phone call 290 pertains based on the voice message text 294 and the context information 296. In illustration, emergency handling service 228 can detect an event to which the phone call 290 pertains based on the voice message text 294 and the context information 296. Further, emergency handling service 228 can determine whether the detected event is an emergency event based on the sentiment analysis performed on the voice message text 294 by sentiment analyzer 226. In illustration, Emergency detection model 304 can be configured to process the sentiment analysis and the context information 296 and, based on such processing, determine whether the sentiment of the voice message text 294 and the context information 296 pertain to an emergency event. In one or more arrangements, emergency handling service 228 can perform emergency detection further based on information retrieved from one or more external sources, for example news sources and/or social media. In illustration, call event handler 302 can access news sources and social media platforms via the Internet. Call event handler 302 can perform NLP on text and/or audio provided by the news sources and social media platforms. Based on the NLP, call event handler 302 can identify current emergency events and their locations. For instance, call event handler 302 can identify addresses, cities, counties, states, provinces, countries, etc. where emergency events have occurred or are occurring. Call event handler 302 also can access one or more geo location services to determine GPS coordinates for those addresses, cities, counties, states, provinces, countries, etc.

At step 608 telecommunications service 210 can determine a severity of the emergency event, and can classify the severity of the emergency event. In illustration, emergency handling service 228 can determine the severity of the emergency event based on the sentiment analysis performed on the voice message text 294 and based on the context information 296. By way of example, severity classification model 306 can process the sentiment analysis and the context information 296 and, based on such processing, determine a severity of the event (e.g., emergency event) to which the phone call 290 pertains. Severity classification model 306 can classify the severity of the event by assigning to the event a classification value. The classification value can be, for instance, a value from one to four, with the classification value one being highest severity and the classification value four being lowest severity. Still, severity classification model 306 can classify the severity of the event in any other suitable manner, and the present arrangements are not limited in this regard.

Referring to decision box 610, if the emergency detection and severity classification indicate that the event to which they pertain is a critical emergency (e.g., assigned a severity value of one), at step 612 telecommunications service 210 (e.g., call event handler 302) can select an action to initiate based on the emergency detection and the severity classification.

At step 614 telecommunications service 210 (e.g., call event handler 302) can initiate performance of the selected action.

Figure 7:
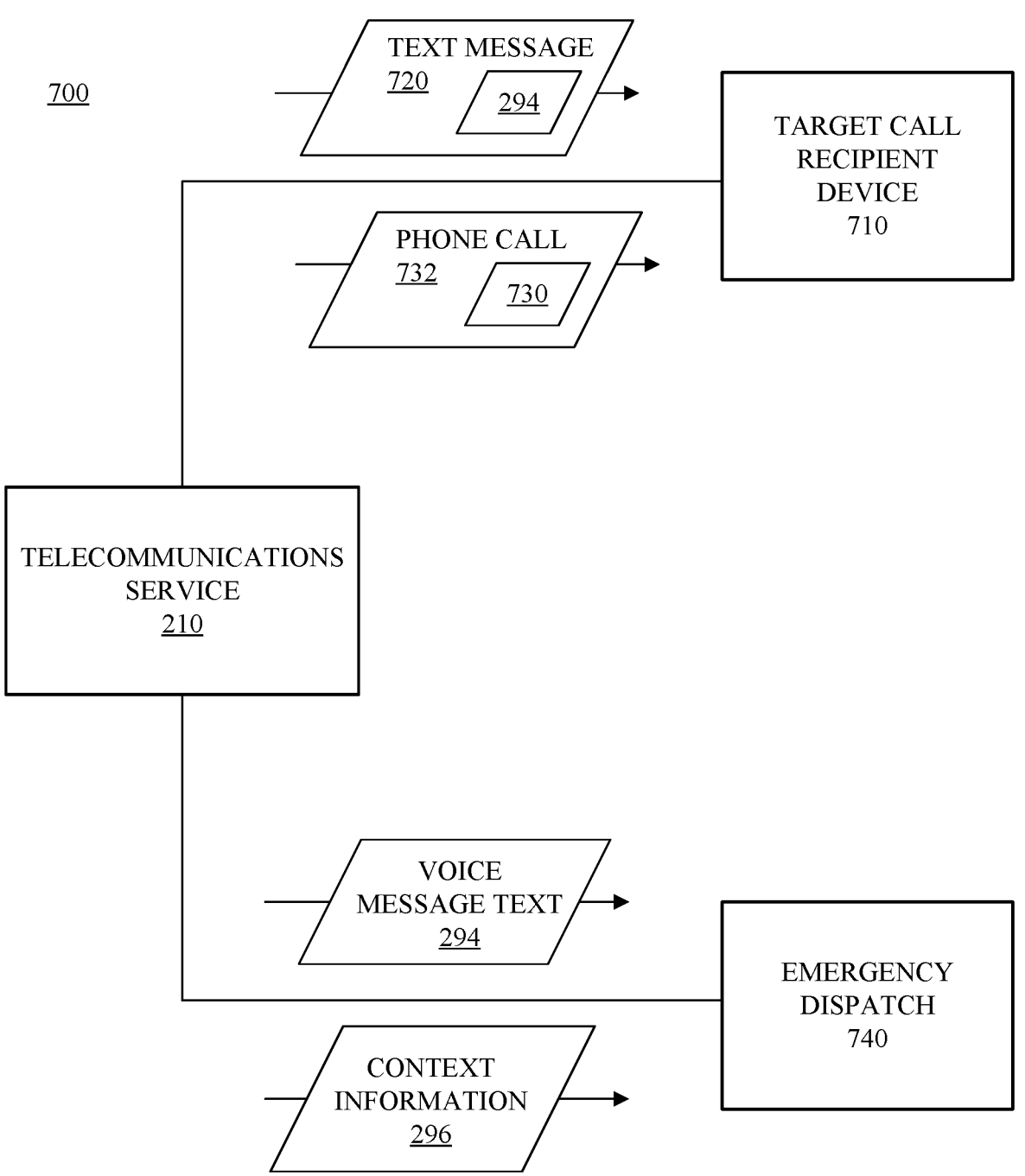
FIG. 7 depicts a mobile communications system according to an embodiment of the present invention.

By way of example, referring to FIGS. 2 and 7, the selected action can be to communicate, to a device 710 (e.g., a mobile device) of the target call recipient, a text message 720 that includes the voice message text 294. Emergency handling service 228 can initiate text messaging service 224 to communicate the text message 720 to target call recipient device 710.

As another example, the selected action can be to synthesize an audio voice message 730 from the voice message text 294 using text-to-speech, place a phone call 732 from call service 222 to target call recipient device 710, and play synthesized voice message 730 to target call recipient device 710 in the phone call 732. If target call recipient does not answer the phone call 732, call service 222 can play synthesized voice message 730 to the voice mail of the target call recipient.

As another example, the selected action can be to forward the voice message text 294 and at least a portion of the context information 296 to an emergency dispatch 740. In illustration, emergency handling service 228 can forward, to emergency dispatch 740, the voice message text 294 and the GPS coordinates where mobile device 240 is located. In response, emergency dispatch 740 can dispatch emergency response services to aid the user of mobile device 240. For example, emergency dispatch 740 can dispatch emergency response services to the GPS coordinates where mobile device 240 is located. Emergency dispatch 740 can select the emergency response services based on the nature of the event to which the voice message text 294 and the context information 296 pertain.

Referring again to FIGS. 2, 6 and 7, if at decision box 610 the emergency detection and severity classification indicate that the event to which they pertain is not a critical emergency (e.g., assigned a severity value less than one), at step 616 telecommunications service 210 (e.g., call event handler 302) can assign the event to a queue. For instance, call event handler 302 can add to the queue the voice message text 294 and the context information 296 pertaining to the event. Call event handler 302 can interface with emergency dispatch 740 to determine whether resources to which actions may be assigned presently are available. In response to one or more resources becoming available, call event handler 302 can select a next event from the queue. In one or more arrangements, call event handler 302 can prioritize events assigned a severity value of two, then events assigned a severity value of three, then events assigned a severity value of four.

Referring to decision box 618, in response to a turn for the event being reached, the process can proceed to step 612. At step 612, telecommunications service 210 (e.g., call event handler 302) can select an action to initiate based on the emergency detection and the severity classification of the event. At step 614 telecommunications service 210 (e.g., call event handler 302) can initiate performance of the selected action for the event.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Several definitions that apply throughout this document will now be presented.

As defined herein, the term "voice message text" means text generated from a voice message by performing speech recognition on the voice message.

As defined herein, the term "telecommunications service" means a voice telephony and data transmission service provided by one or more data processing systems.

As defined herein, the term "mobile device" means a mobile data processing system, including at least one processor and memory, that communicates telephony data and text messages via at least one telecommunication service. A "mobile device" also may communicate a myriad of other data, and may communicate data with other types of services.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "computer readable storage medium" means a storage medium that contains or stores program code for use by or in connection with an instruction execution system, apparatus, or device. As defined herein, a "computer readable storage medium" is not a transitory, propagating signal per se.

As defined herein, the term "data processing system" means one or more hardware systems configured to process data, each hardware system including at least one processor programmed to initiate executable operations and memory.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "server" means a data processing system configured to share services with one or more other data processing systems.

As defined herein, the term "end user device" means a data processing system that requests shared services from a server, and with which a user directly interacts. Examples of a client device include, but are not limited to, a workstation, a desktop computer, a computer terminal, a mobile computer, a laptop computer, a netbook computer, a tablet computer, a smart phone, a personal digital assistant, a smart watch, smart glasses, a gaming device, a set-top box, a smart television and the like. Network infrastructure, such as routers, firewalls, switches, access points and the like, are not end user devices as the term "end user device" is defined herein.

As defined herein, the term "automatically" means without user intervention.

As defined herein, the term "user" means a person (i.e., a human being).

What is claimed is:

1. A computer-implemented method, comprising:

receiving, by a processor, from a mobile device, a voice message text for a first voice message provided by a user for a first phone call initiated by the user, wherein the receiving of the voice message text is based on the first phone call that is not connected to a target recipient device;

receiving, by the processor, from the mobile device, context information pertaining to the first phone call;

generating, by the processor, sentiment data by performing a sentiment analysis on the voice message text;

determining, by the processor, a severity of an event to which the first phone call pertains based on the context information and the sentiment data;

selecting, by the processor, an action based on the severity of the event to which the first phone call pertains; and initiating, by the processor, performance of the action, wherein the action includes:

synthesizing a second voice message from the voice message text;

initiating a second phone call to the target recipient device; and playing the synthesized second voice message to the target recipient device in the second phone call.

2. The computer-implemented method of claim 1, wherein the context information comprises data indicating a tone of a voice of the user in the first voice message.

3. The computer-implemented method of claim 1, wherein the context information comprises data indicating a speech pattern of spoken utterances of the user in the first voice message.

4. The computer-implemented method of claim 1, wherein the context information comprises data indicating a ratio of an acoustic volume of a voice of the user to an acoustic volume of ambient sounds detected by an input audio transducer of the mobile device.

5. The computer-implemented method of claim 1, wherein the context information comprises data indicating at least one unusual anomaly in physiological data of the user.

6. The computer-implemented method of claim 1, further comprising:

classifying the severity of the event; and adding the event to a queue based on a classification of the severity of the event not being a highest severity, wherein the selecting of the action is based on a turn for the event in the queue being reached.

7. The computer-implemented method of claim 6, wherein the adding the event to the queue comprises adding to the queue the voice message text and the context information.

8. A system, comprising:

a processor programmed to initiate executable operations comprising:

receiving, from a mobile device, a voice message text for a first voice message provided by a user for a first phone call initiated by the user, wherein the receiving of the voice message text is based on the first phone call that is not connected to a target recipient device;

receiving, from the mobile device, context information pertaining to the first phone call;

generating sentiment data by performing a sentiment analysis on the voice message text;

determining a severity of an event to which the first phone call pertains based on the context information and the sentiment data;

selecting an action based on the severity of the event to which the first phone call pertains; and initiating performance of the action, wherein the action includes:

synthesizing a second voice message from the voice message text;

initiating a second phone call to the target recipient device; and playing the synthesized second voice message to the target recipient device in the second phone call.

9. The system of claim 8, wherein the context information comprises data indicating a tone of a voice of the user in the first voice message.

10. The system of claim 8, wherein the context information comprises data indicating a speech pattern of spoken utterances of the user in the first voice message.

11. The system of claim 8, wherein the context information comprises data indicating a ratio of an acoustic volume of a voice of the user to an acoustic volume of ambient sounds detected by an input audio transducer of the mobile device.

12. The system of claim 8, wherein the context information comprises data indicating at least one unusual anomaly in physiological data of the user.

13. The system of claim 8, further comprising:

classifying the severity of the event; and adding the event to a queue based on a classification of the severity of the event not being a highest severity, wherein the selecting of the action is based on a turn for the event in the queue being reached.

14. The system of claim 13, wherein the adding the event to the queue comprises adding to the queue the voice message text and the context information.

15. A computer program product, comprising:

one or more computer readable storage mediums having program code stored thereon, the program code stored on the one or more computer readable storage mediums collectively executable by a data processing system to initiate operations including:

receiving, from a mobile device, a voice message text for a first voice message provided by a user for a first phone call initiated by the user, wherein the receiving of the voice message text is based on the first phone call that is not connected to a target recipient device;

receiving, from the mobile device, context information pertaining to the first phone call;

generating sentiment data by performing a sentiment analysis on the voice message text;

determining a severity of an event to which the first phone call pertains based on the context information and the sentiment data;

selecting an action based on the severity of the event to which the first phone call pertains; and initiating performance of the action, wherein the action includes:

synthesizing a second voice message from the voice message text;

initiating a second phone call to the target recipient device; and playing the synthesized second voice message to the target recipient device in the second phone call.

16. A computer-implemented method, comprising:

initiating, by a processor of a mobile device, a first phone call to a target recipient device;

receiving, by the processor, from a telecommunications service, a call status indicator that indicates the first phone call is not connected to the target recipient device;

outputting, by the processor, based on the receiving of the call status indicator that indicates the first phone call is not connected to the target recipient device, a prompt to a user to provide a first voice message;

receiving, by the processor, based on the prompt to the user to provide the first voice message, the first voice message from the user;

converting, by the processor, the first voice message to a voice message text;

determining, by the processor, context information pertaining to the first phone call by analyzing the first voice message; and communicating, by the processor, the voice message text and the context information to the telecommunications service, wherein the telecommunications service determines a severity of an event to which the first phone call pertains based, at least in part, on the context information, selects an action based on the severity of the event to which the first phone call pertains, and initiates performance of the action, and the action includes:

synthesizing a second voice message from the voice message text, initiating a second phone call to the target recipient device, and playing the synthesized second voice message to the target recipient device in the second phone call.

17. The computer-implemented method of claim 16, wherein the context information comprises data indicating a tone of a voice of the user in the first voice message.

18. The computer-implemented method of claim 16, wherein the context information comprises data indicating a speech pattern of spoken utterances of the user in the first voice message.

19. The computer-implemented method of claim 16, wherein the context information comprises data indicating a ratio of an acoustic volume of a voice of the user to an acoustic volume of ambient sounds detected by an input audio transducer of the mobile device.

20. The computer-implemented method of claim 16, wherein the context information comprises data indicating at least one unusual anomaly in physiological data of the user.

21. A mobile device, comprising:

a processor programmed to initiate executable operations comprising:

initiating a first phone call to a target recipient device;

receiving, from a telecommunications service, a call status indicator that indicates the first phone call is not connected to the target recipient device;

outputting, based on the receiving of the call status indicator that indicates the first phone call is not connected to the target recipient device, a prompt to a user to provide a first voice message;

receiving, based on the prompt to the user to provide the first voice message, receiving the first voice message from the user;

converting the first voice message to a voice message text;

determining context information pertaining to the first phone call by analyzing the first voice message; and communicating the voice message text and the context information to the telecommunications service, wherein the telecommunications service determines a severity of an event to which the first phone call pertains based, at least in part, on the context information, selects an action based on the severity of the event to which the first phone call pertains, and initiates performance of the action, and the action includes:

synthesizing a second voice message from the voice message text, initiating a second phone call to the target recipient device, and playing the synthesized second voice message to the target recipient device in the second phone call.

22. The mobile device of claim 21, wherein the context information comprises data indicating a tone of a voice of the user in the first voice message.

23. The mobile device of claim 21, wherein the context information comprises data indicating a speech pattern of spoken utterances of the user in the first voice message.

24. The mobile device of claim 21, wherein the context information comprises data indicating a ratio of an acoustic volume of a voice of the user to an acoustic volume of ambient sounds detected by an input audio transducer of the mobile device.

25. The mobile device of claim 21, wherein the context information comprises data indicating at least one unusual anomaly in physiological data of the user.

* * * * *